April 4, 1939.  H. G. IRWIN  2,152,963
WIND POWER MACHINE
Filed Oct. 26, 1936  4 Sheets-Sheet 1
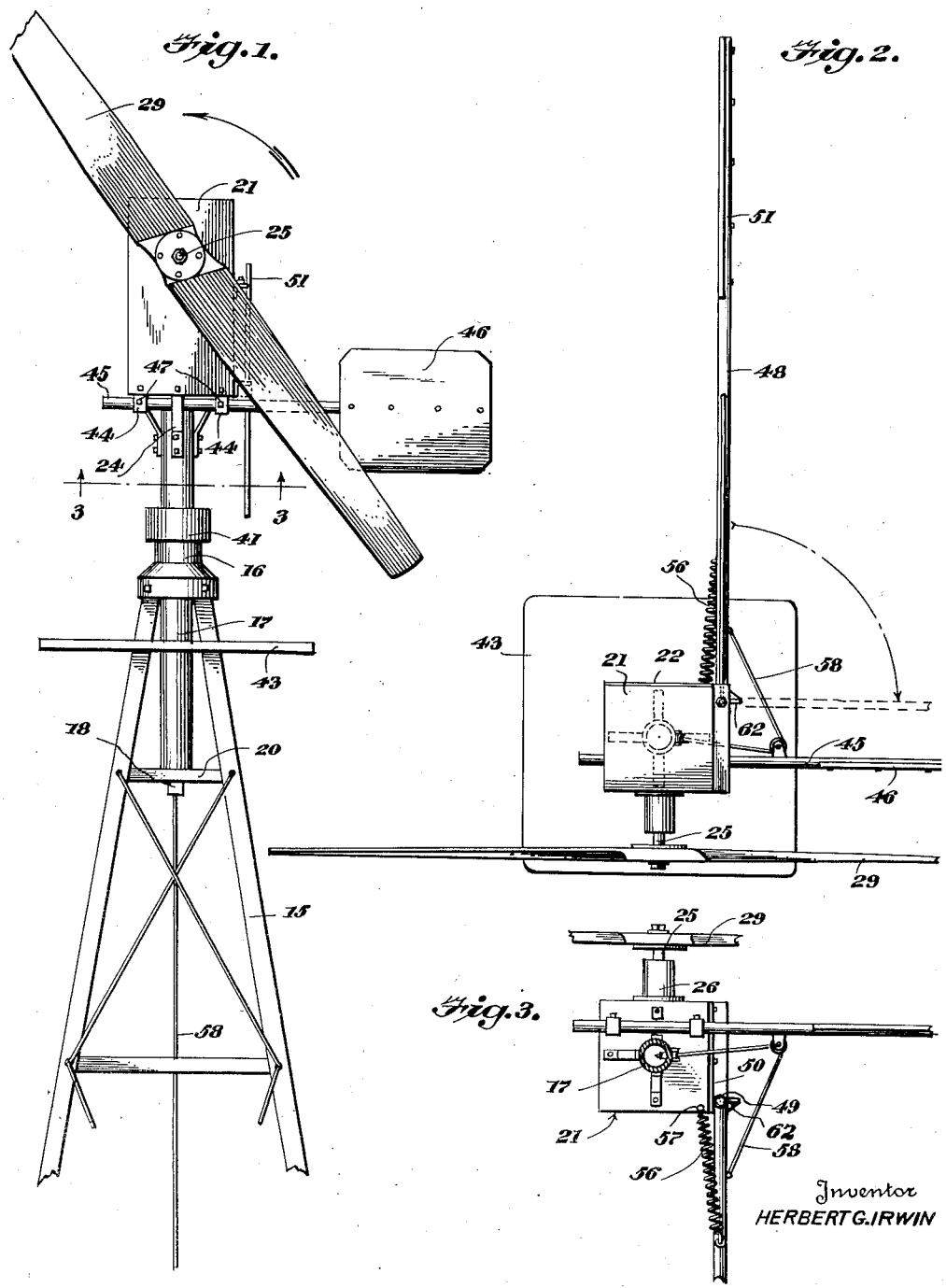
Inventor
HERBERT G. IRWIN
By Irving L. McCathran
Attorney

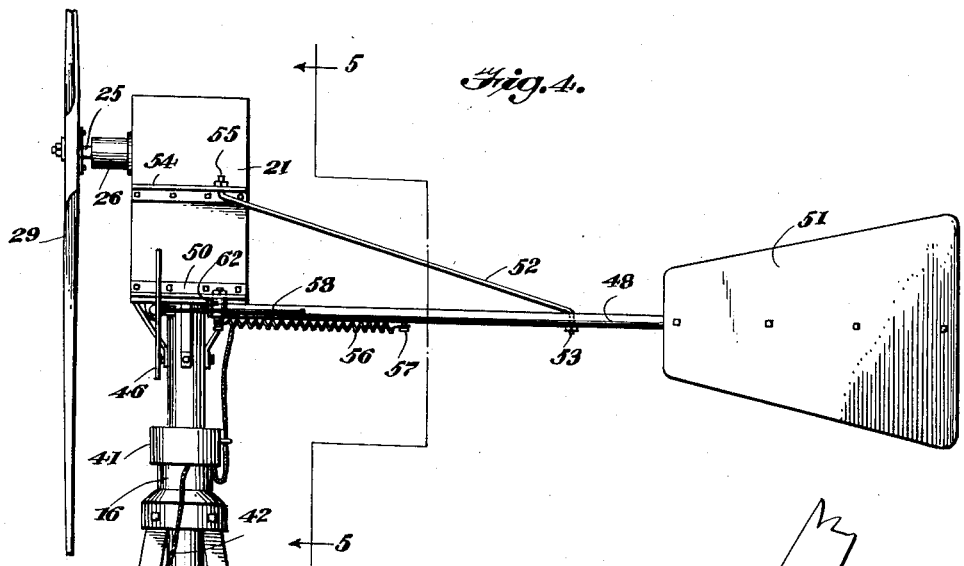
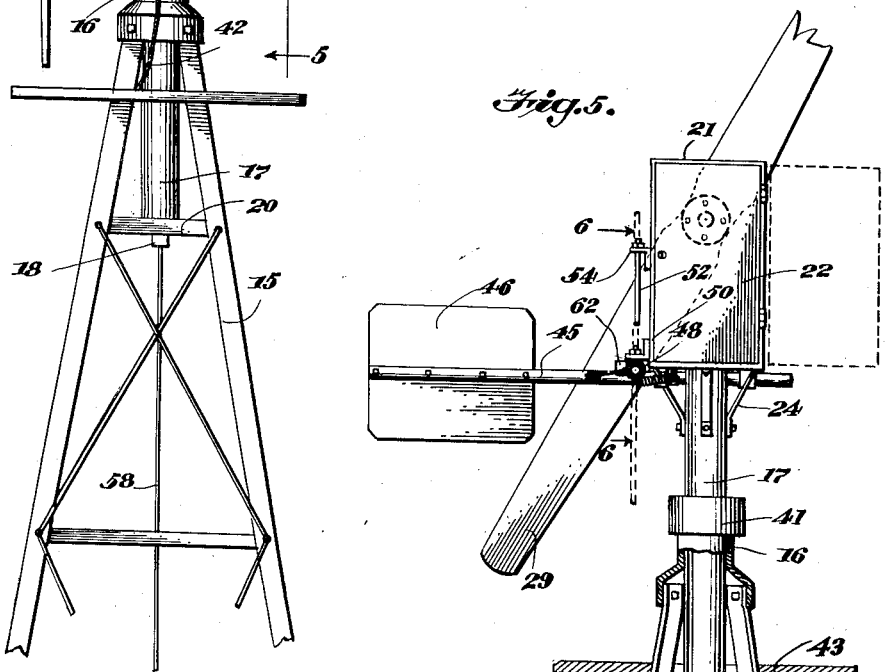
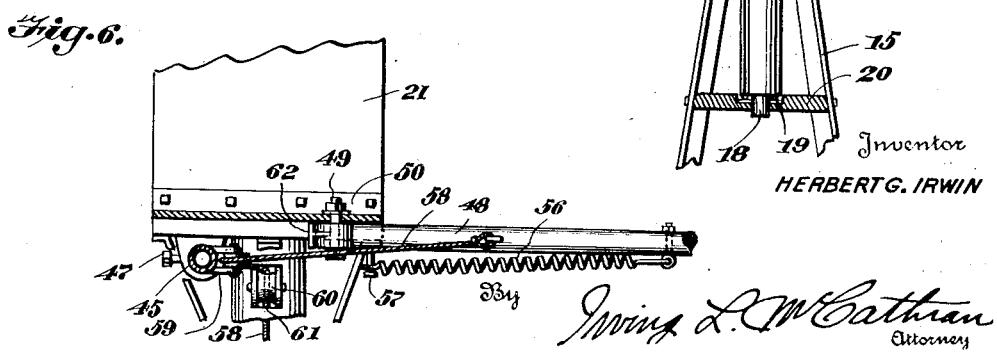

April 4, 1939.   H. G. IRWIN   2,152,963
WIND POWER MACHINE
Filed Oct. 26, 1936   4 Sheets-Sheet 3
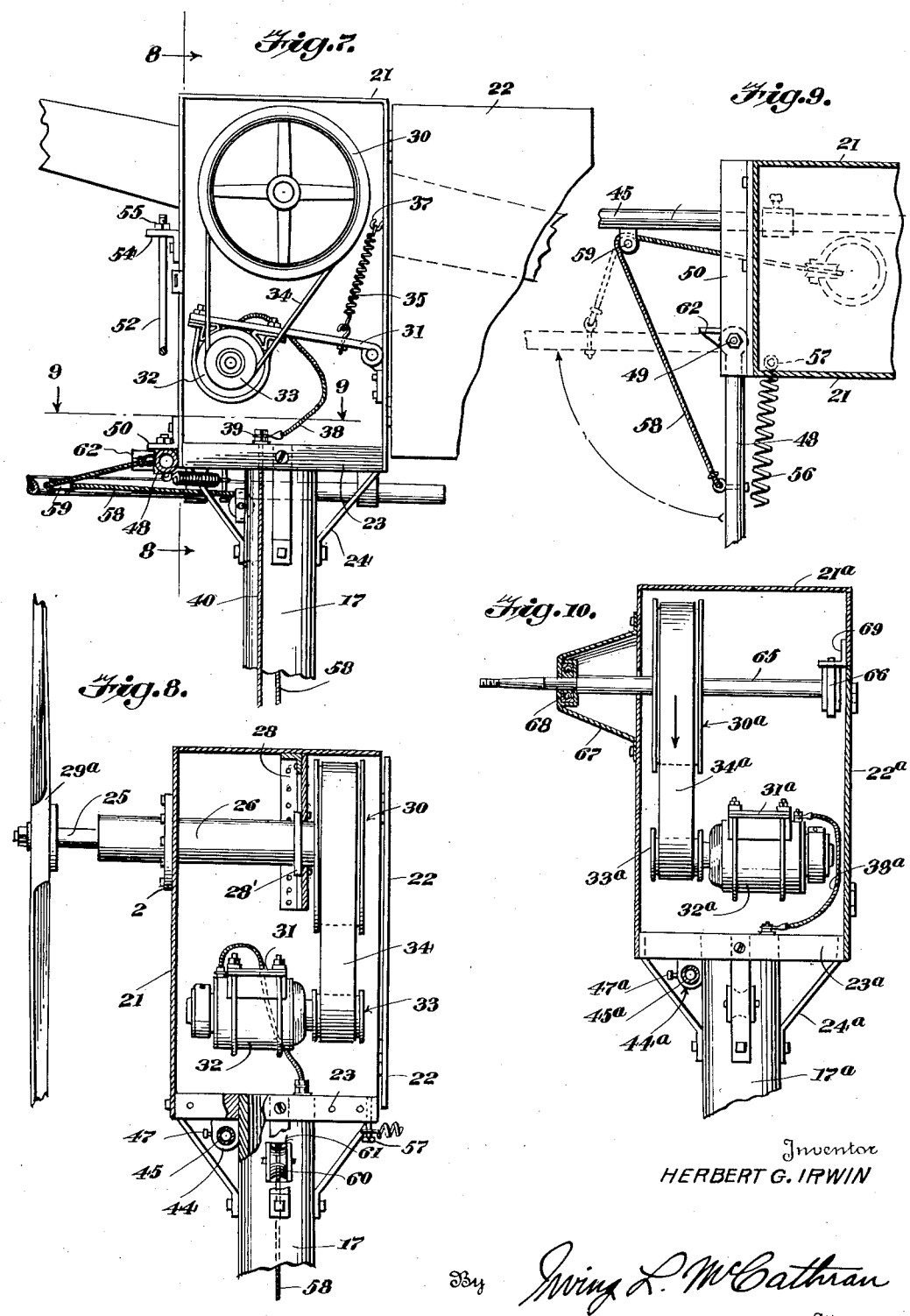
Inventor
HERBERT G. IRWIN
By Irving L. McCathran
Attorney

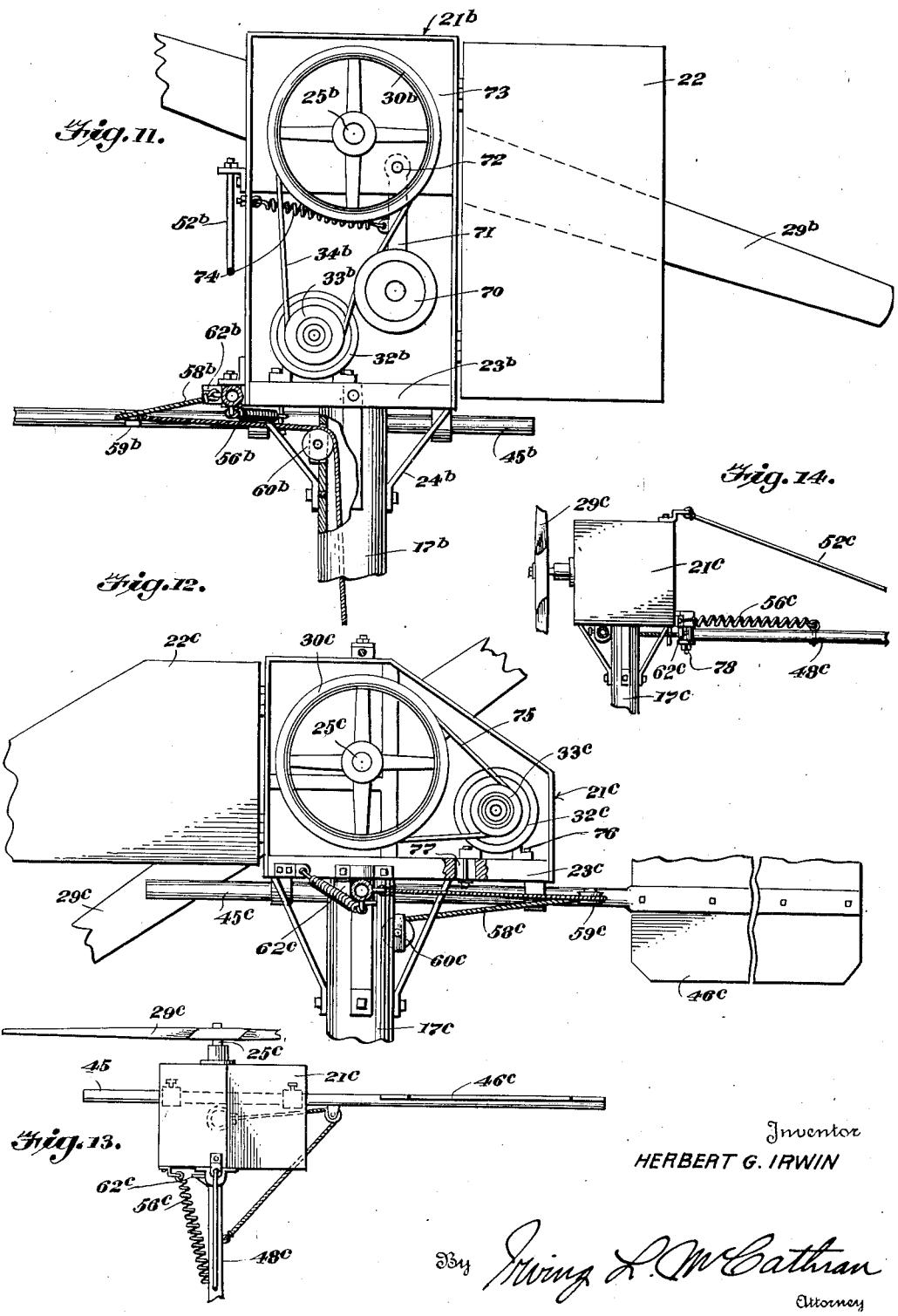

Patented Apr. 4, 1939

2,152,963

UNITED STATES PATENT OFFICE 2,152,963

WIND POWER MACHINE

Herbert G. Irwin, Amarillo, Tex.

Application October 26, 1936, Serial No. 107,705

2 Claims. (Cl. 290—55)

My invention relates to a wind power machine of the type for use in supplying motive power for driving an electric generator, and the primary object of my invention is to provide a wind driven machine of a simple construction for driving a small electric generator which in turn charges an electric storage battery.

A further object of my invention is to provide a wind power machine for use in the windy sections of the country and which will drive an electric generator of the automotive type in a highly efficient manner.

A further object of my invention is to provide in a machine of the character stated, a belt drive mechanism which will insure against slipping of the belt over the pulley of the generator or the belt drive wheel as well as prevent the belt from coming off the pulley or drive wheel.

A still further object of my invention is to provide in a machine of the character stated, a housing for the belt drive mechanism with a door through which the belt may be removed from the drive wheel and generator pulley and a new belt replaced thereon, and through which door the generator may be inspected at intervals or removed for replacement or repairs.

Another object of my invention is to provide in a machine of the character stated, arrangement of the belt drive mechanism whereby the generator may be removed for repairs or replacement without disturbing the mechanism for driving the belt.

Still another object of my invention is to provide in a machine of the character stated, automatic adjustment of the generator drive belt whereby sufficient driving tension of the belt is maintained automatically as the belt stretches in use and as in expansion and contraction of the belt due to varying weather conditions.

Other objects and advantages of the present invention will appear throughout the following specification and claims.

In the drawings:—

Figure 1 shows a wind power electric plant constructed in accordance with my invention;

Figure 2 is a top plan view of the wind power plant;

Figure 3 is a transverse sectional view taken on line 3—3 of Figure 1;

Figure 4 is a side view of the wind power plant;

Figure 5 is a vertical sectional view taken on line 5—5 of Figure 4;

Figure 6 is a vertical sectional view taken on line 6—6 of Figure 5;

Figure 7 is an enlarged rear elevation of the power house of the power plant, showing the rear door open and certain parts in section;

Figure 8 is a vertical sectional view taken on line 8—8 of Figure 7;

Figure 9 is a horizontal sectional view taken on line 9—9 of Figure 8;

Figure 10 is a central vertical section of a modified form taken through the power house, certain parts being shown in side elevation;

Figure 11 is a rear elevation of a modified form of power mechanism illustrating a tension belt tightening means;

Figure 12 is a rear elevation of a further modified form of power mechanism;

Figure 13 is a top plan view of the structure shown in Figure 12, the door being shown in a closed position; and Figure 14 is a side elevation of the structure shown in Figures 12 and 13.

By referring to the drawings in detail it will be seen that 15 designates a tower which carries at its upper end a tower sleeve 16 through which is rotatably mounted a vertically extending tubular column or neck 17, the lower end being provided with a reduced extension 18 supported within a bearing 19 carried by a platform 20 mounted upon the tower 15 below the tower sleeve 16.

The tubular column or neck 17 supports at its upper end a power house 21 which preferably consists of a rectangular hollow casing having a door 22 at one side to facilitate access to the interior of the power house for the purpose of installation of the working parts. The power house 21 comprises a base plate or bottom platform 23 which is braced by means of the angle braces 24 secured to the sides of the tubular column or neck 17 and also to the bottom 23.

A rotor blade-supporting shaft 25 extends transversely of the power house 21 and is carried by a transversely extending tubular bearing housing 26 having suitable bearings at its respective ends of a conventional type, this bearing housing 26 being secured, as at 27, to the power house 21 near its forward end and being secured to a depending hanger 28, as at 28', at its inner end. The hanger 28 is preferably suspended from the top of the power house 21, as shown in detail in Figure 8. A rotor blade or propeller blade 29 is fixed to the outer end of the shaft 25, and the inner end of the shaft 25 supports a flanged pulley 30, which flanged pulley is preferably located near the rear door 22, as shown in Figure 8.

A hinged bracket arm in the nature of a hinged platform 31 is carried by the power house below the pulley 30, the platform or bracket arm 31 being hinged to one side of the power house, as shown in Figure 7. Suspended below this hinged bracket or platform 31 is a generator 32 having a flanged driving pulley 33 at one end located directly below the flanged pulley 30, as shown in Figures 7 and 8. A flat driving belt 34 passes over the pulleys 30 and 33, the generator drive pulley 33 being suspended within the lower bight of the drive belt, and all or part of the weight of the generator may be supported by the belt because of this suspended position of the generator drive pulley 33. For the purpose of regulating or adjusting the amount of frictional grip of the pulley 33 upon the belt 34, a coil spring 35 is employed, the coil spring 35 being connected to the bracket 31, as at 36, and to one side of the power house 21, as at 37. Where a small generator is used this spring may be eliminated, but where a heavier type generator is used, a spring of suitable tension is provided to produce the desired driving tension for the belt.

From the foregoing description, it will be seen that the generator 32 will be suspended upon the belt in a floating position thereby insuring suitable driving tension at all times with respect to the belt whether the belt stretches in use or expands and contracts due to changeable weather conditions. The belt 34 consequently will be at all times tight and a suitable tension will be automatically maintained, thereby eliminating the slipping of the driving belt which might be occasioned by the belt stretching or becoming loose on the pulley for any reason.

The door 22, as will be obvious, is normally kept closed, but is so located upon one side of the power house as to permit easy access of the power house for the purpose of replacing the belt 34, the generator 32, or repairing these or other parts located within the power house. A flexible current take-off 38 is connected at one end to the generator 33, and at the other end to the terminal 39 to which terminal 39 is electrically connected a flexible conduit 40 of the conventional type leading down to a conventional swivel brush rigging mounted within the housing 41 carried at the upper end of the tower sleeve 16. This swivel brush rigging may be of a conventional well-known type, and it is thought unnecessary to specifically describe this particular electrical construction. A wire 42 leads from this swivel brush rigging down the tower and off to a suitable support to an automatic circuit cut-out and storage battery or other source of electrical distribution. Where the automotive generator is of the type having an automatic circuit cut-out mounted on the generator the flexible cable 38 may connect the cut-out or the generator with the tower wire 42, and the wire 42 may lead directly to the storage battery or other point of distribution. The other circuit of the generator, that is to say, the return circuit or ground circuit, may constitute a second wire carried by the supports in any conventional manner and extend through the upper portion of the tower to the generator body 32 which is carried by the bracket 31.

As shown in Figures 1, 2, 4 and 5, a suitable work platform 43 is carried by the tower 15 below the tower sleeve 16, and in a convenient position for supporting a workman whereby he may have convenient access to the working parts supported by the upper end of the tower 15.

A plurality of hanger members 44 are suspended below the bottom 23 of the power house 21 in a position to support a transversely extending storm vane arm 45 directly below the bottom of the power house, this arm 45 being adjustable longitudinally through the aligned hanger members 44 and extending transversely of the longitudinal axis of the shaft 25. A vertically extending storm vane 46 is carried by the outer end of the arm 45 and these hangers 44 are provided with adjusting bolts 47 which will permit the arm 45 to be adjusted to move the storm vane 46 toward or away from the power house 21, as occasion may require. This storm vane constitutes a governor for regulating the speed of the rotor blade 29 during high winds and storms. The vane arm 45, as shown, extends at right angles to the rotor blade shaft 25, and one flat side of the vane 46 faces the wind in the same direction as the rotor blade. This position of the storm vane is clearly shown in Figures 1, 2, 3, 4 and 5. During high winds and storms the excess wind pressure which would revolve the rotor blade at an excessive speed tending to damage or burn out the generator will press the storm vane around toward the leeward, which action turns the power house 21, the tubular column 17 rotating within the sleeve 16 and bearing 19, and thus the rotor blade 29 faces the wind at an angle. Consequently, the driving power of the wind on the rotor blade 29 is reduced and the speed of the rotor blade is maintained within safe limits. By adjusting the storm vane arm 45 so as to position the storm vane further out from the house, less wind pressure will move the vane leeward and the rotor blade will be caused to revolve at an angle to the wind with less speed. By adjusting the arm 45 in its brackets so as to position the storm vane closer to the house 21, more wind pressure on the vane 46 will be required to move the rotor blade around to revolve at an angle to the wind and consequently a higher rate of speed will be maintained in high winds. It will, therefore, be understood that by setting the storm vane toward or outward of the house 21 various rates of speed of the rotor blade may be obtained in a high wind. Furthermore, the storm vane 46 may be positioned to prevent excess speed during storms to prevent damaging the generator, as above set forth.

A vane arm 48 is pivotally secured, as at 49, to a bracket 50 carried upon one side of the power house 21, note Figure 9. This vane arm preferably normally extends in substantially parallel alignment with the longitudinal axis of the shaft 25 and rearwardly of the power house 21 and carries a vertically extending vane 51 at its rear end. The vane arm 48 is braced by an upwardly inclined bracing member 52 which is secured to the arm 48, as at 53, and to a bracket 54 carried by the power house 21, as at 55. A coil spring 56 has one end secured, as at 57, to the vane arm 48 and the other end of the coil spring 56 is secured to the under face of the power house 21, as at 57', to normally hold the vane arm 48 in a rearwardly extending position with respect to the power house 21, and it should be understood that the constant changing of the winds and the action of the winds upon the vane 51 will cause the tubular column 17 to continually rotate and automatically hold the rotor blade 29 in a position facing the wind except during a storm when the vane 46 will operate in the manner previously described. A flexible pull element in the nature of a cable, chain or similar member 58 is connected to the vane arm 48 a suitable distance from its pivoted end and passes over a pulley 59 carried by the vane arm 45 and also passes over a pulley 60 carried by the tubular column 17, which tubular column is apertured as at 61, to provide a mounting for the pulley 60 and to permit the flexible pull element 58 to pass down through the hollow tubular column 17 and down through the tower 15, as shown in Figure 4, where this flexible pull element, cable or chain may be reached by a person on the ground for the purpose of pulling the vane arm 48 from a position shown in full lines in Figures 2 and 9 to a position shown in dotted lines in Figures 2 and 9, against the tension of the spring 56. In this manner the rotor blade 29 may be manually swung out of the wind when it is desired to do so and the pull element fastened or tied down. The bracket 59 is placed slightly above the lower edge of the power house 21 to allow the arm 48 to rest thereagainst to provide a stop limiting the swinging movement of the arm 41 in one direction. By referring to Figure 1, it will be noted that the blade 29 is adapted to revolve in the direction of the arrow and that normally the storm vane 46 extends horizontally and approximately parallel with the plane of revolution of the blade 29, the vane 51 extending at approximately right angles.

A stop 62 is carried by the inner end of the vane arm 48 and extends at right angles to the vane arm so as to limit the swinging of the vane arm 48 in the direction of the arrow beyond the position shown in dotted lines.

It should be understood that as the flexible pull element 58 is pulled downwardly, the vane arm 48 will be swung upon its pivot 49 to a position substantially parallel to the storm vane 46. This moves the vane 51 around the house 21 to within a short distance of the storm vane 46 and with both vanes positioned at right angles to the rotor blade shaft, the rotor blade will be moved to a position where it is directly edgewise to the wind constituting an off position for the blade 29. This pull element 58 may be fastened as above stated when it is desired to retain the parts in this position. It should be further understood that by means of the door 22 which is preferably hinged to the power house 21, access may be had to the interior of the house 21 for inspection of the generator and drive mechanism at intervals and for applying lubricant to the bearings. Consequently, the generator may be easily and conveniently removed from the house for repairs and replacement with a new or reconditioned generator and a new drive belt may be conveniently placed in service when necessary.

The present invention is particularly suited for rural districts and may be utilized for charging automobile storage batteries, as well as batteries for lights, radio, and other purposes. Furthermore, the usual automobile electric generator may be used in place of the generator 32, providing for continued use of discarded automobile parts. The parts are mounted within a covered weatherproof power house 21 where the generator is mounted out of the weather protecting the belt drive mechanism and is at the same time accessible for inspection.

By referring to Figure 10, it will be noted that a slightly modified structure is illustrated wherein a tubular column or neck 17a similar to the column 17 is employed for supporting the power house bottom 23a which is braced by the braces 24a. A storm vane arm 45a is carried by brackets 44a and this arm 45a is held in an adjusted position by the bolts 47a in a manner similar to that as described with respect to the arm 45 in the previously mentioned structure. A generator 32a is supported upon a bracket 31a similar to the bracket 31, and a flexible current take-off cable 38a similar to the cable 38 is also employed in a similar manner. A flanged pulley 33a is carried by the generator 32a over which passes a flat belt 34a similar to the belt 34, the belt 34a also passing over the flanged pulley 30a similar to the pulley 30, these parts being mounted in a power house 21a having a door 22a similar to the structure illustrated in Figure 8.

The pulley 30a is supported upon a rotor blade supporting shaft 65 which shaft is journaled at its inner end in an anti-friction bearing 66 supported within the power house 21a. The shaft 65 extends through the front face of the casing of the power house 21 and extends also through a cone-shaped housing 67 which carries an anti-friction bearing 68 at its outer end. This structure is similar to the structure shown in the preferred embodiment with the slight exception of the mounting of the shaft 65. The rear bearing 66 is detachably secured to a supporting bracket 69 so that the shaft may be lowered a short distance to pass the drive belt edgewise when replacing a worn out belt. The pulley 30a is carried by the shaft near the front face of the power house housing 21a, as well as the pulley 33a, which pulleys are in alignment, this constituting also a slight difference over the previously described embodiment. The door 22a, however, is slightly lower than the door 22 in the preferred embodiment, and is adapted to close under the rear wall, as shown in Figure 10, the bracket 69 being supported upon the inner face of the rear wall. The wind vane and the storm vane may be carried by the power house 21a in a manner similar to that previously described. In the embodiment shown in Figure 10, a right hand wind rotor blade may be used and with the brush end of the generator toward the door, worn out commutator brushes may be removed and new brushes inserted with freedom.

Attention is now directed to Figure 11, illustrating a slightly different modified form of means for holding the belt in a tight position, the parts of which are similar to the form shown in Figure 1 being indicated by similar numerals with the addition of the letter "b". A power house 21b is illustrated having a door 22b and a pulley 30b is supported upon a rotor blade 25b. A flat drive belt 34b passes over the pulley 30b and over a pulley 33b carried by the generator 32b which generator is fastened securely to the bottom 23b of the power house 21b. An idler wheel 70 is swung on the lower end of a depending arm 71 which is pivotally secured, as at 72, at its upper end to a bracket plate 73 mounted within the power house 21b. A spiral spring 74 is secured at one end intermediate the length of the arm 71 and at its opposite end to one side wall of the power house 21b. This spring 74 pulls the idler wheel 70 against the outer face of the drive belt 34b midway between the drive pulley 33b and the pulley 30b. This will keep the belt under a proper tension and provide the proper friction upon the pulleys. Any expansion or contraction of the belt will in this way be compensated for by the pull of the spring 74.

While a flat belt drive is shown in Figure 6, it should be understood that a V-type belt may be substituted without departing from the spirit of the invention, in which event the idler wheel should exert slightly less pressure upon the belt.

It is usually thought advisable to employ a flat belt because of its flexible nature.

In Figures 12, 13 and 14, there is shown a further modified type of the invention, the parts which are similar to the structure shown in Figure 1 being identified by similar numerals with the addition of the letter "c". In this structure shown in Figures 12 to 14 a generator 32c is preferably secured to the bottom 23c of the power house 21c. A drive wheel 30c is supported upon a shaft 25c, and this wheel constitutes preferably a V-belt drive wheel having a circumferential groove to receive a V-belt 75 which passes over a V-belt pulley 33c carried by the generator 32c. The generator 32c may be adjustably mounted upon the base 32 by having the hold down bolts 76 extending through the longitudinal slots 77 formed in the bottom 23. This will permit lateral adjustment of the generator to tighten the drive belt. A wind vane supporting arm 48c is pivotally secured to one side of the power house 21c, as at 78, and a coil spring 56c is connected to the arm 48c and the power house 21c in a manner somewhat similar to that described in the previous embodiment. A storm vane 46c is also carried by the under face of the power house 21c.

It should be understood that I do not desire to limit my invention to any particular type of belt since the particular type of belt may be varied to suit the conditions. Where a V-belt drive is employed, V-faced idle wheels may be also utilized in place of the flat wheels. Furthermore, the spring tension may be located and regulated to at all times hold the belt at a proper tension.

Having described the invention, what I claim as new is:

1. A wind power machine comprising a power house, a tower for supporting said power house for rotating movement, a wind rotor blade, a blade supporting shaft projecting laterally of said power house, a belt drive wheel carried by said shaft and disposed within said house, an electric generator disposed within said house, a belt for driving said generator from said wheel, a wind vane pivotally attached to said house, a spring and stop for normally holding said house with respect to said wind vane for directing the wind rotor blade toward the wind, and a storm vane laterally adjustable with respect to said house for automatically opposing said spring to shift the house under excessive winds to cause the rotor blade to revolve at an angle to the wind at limited speed.

2. A wind power machine comprising a power house, means for rotatably supporting the same upon a tower, a wind rotor blade, a shaft supporting said blade in a projecting position with respect to said power house, a belt driven generator located within said house and actuated from said shaft, means for directing said rotor blade toward the wind, a storm vane disposed in a plane parallel with the plane of revolution of said rotor blade, an arm projecting laterally of said power house and supporting said storm vane, and means adjustably supporting said arm adjacent to said power house whereby the distance of the storm vane from the house may be adjusted to obtain a desired speed limit of the rotor blade in strong winds.

HERBERT G. IRWIN.